UNITED STATES PATENT OFFICE.

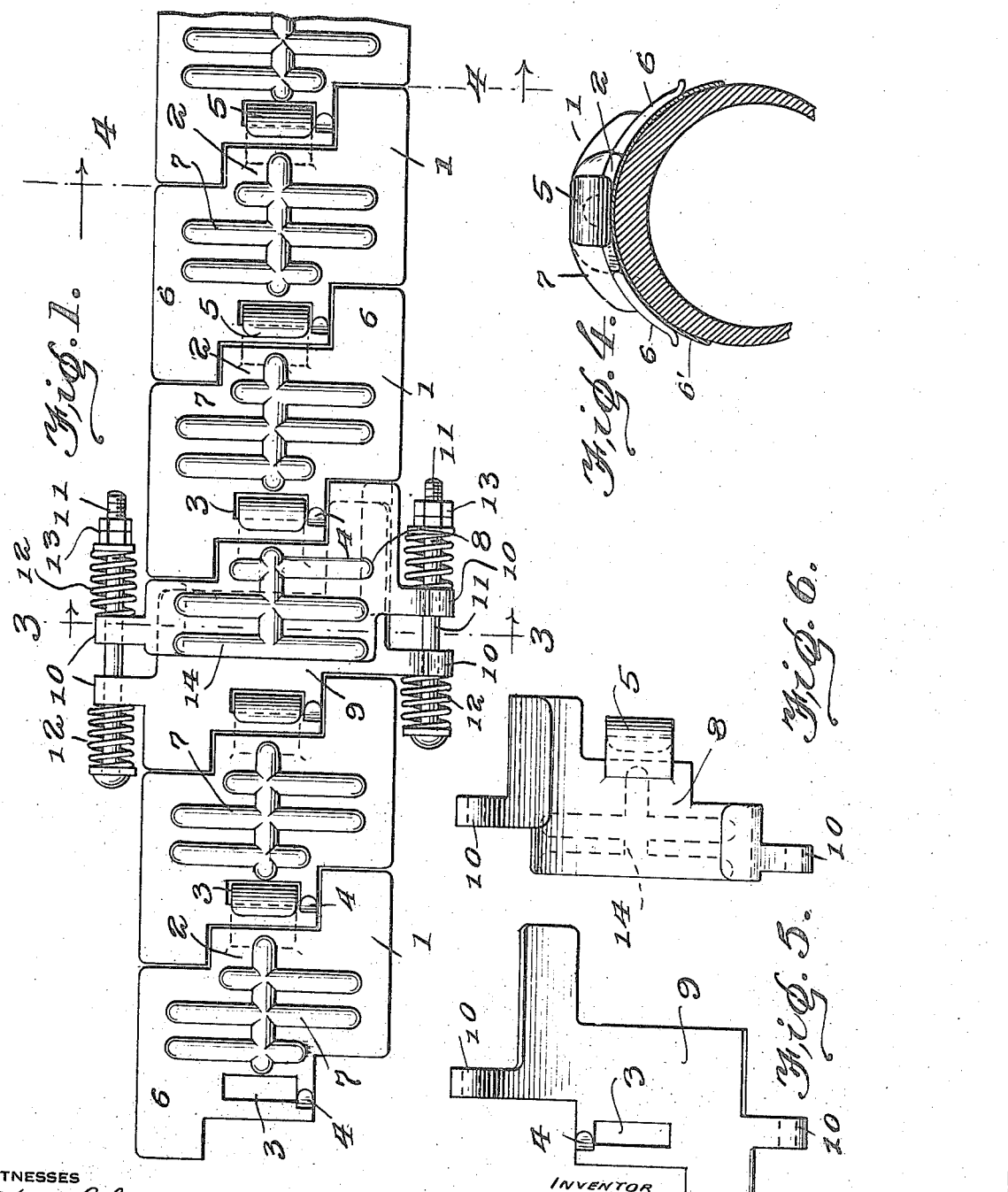

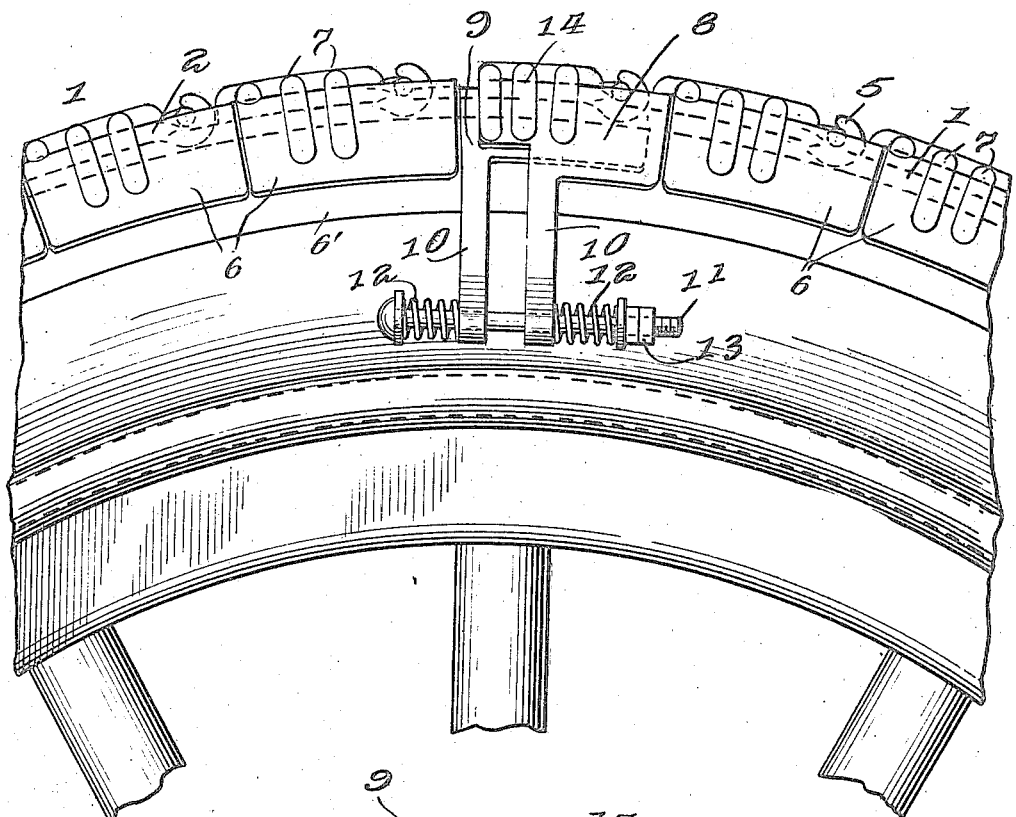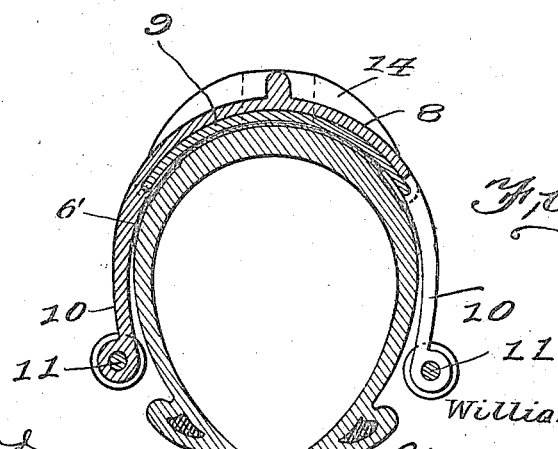

WILLIAM J. ADAMS, OF MOBILE, ALABAMA.

TIRE-ARMOR.

1,269,362.  Specification of Letters Patent. Patented June 11, 1918.

Application filed July 9, 1917. Serial No. 179,523.

*To all whom it may concern:*

Be it known that I, WILLIAM J. ADAMS, a citizen of the United States, residing at Mobile, in the county of Mobile and State of Alabama, have invented new and useful Improvements in Tire-Armors, of which the following is a specification.

This invention relates to armors especially adapted to be used upon rubber and similar tires and it consists in the novel features hereinafter described and claimed.

An object of the invention is to provide an armor adapted to completely surround the tire when applied, the parts of the armor being so connected and arranged that the full resiliency of the tire is preserved.

With this object in view the armor comprises a series of links of special design which are adapted to be connected with each other by sliding the links edgewise and engaging the knuckle of one link through an opening of the adjacent link in a manner similar to that which is followed when the links of a sprocket chain are connected together. The said links are provided with side portions which project beyond the ends of their intermediate portions, that is to say the side portion at one side of the link extends beyond one end of the intermediate portion thereof while the side portion at the opposite side of the link projects beyond the other end of the intermediate portion of the link. The side portions of the link are adapted to lie against the side portions of the tire and the link may be provided with ribs or projections adapted to come in contact with the surface of the roadway and serve as anti-skidding members.

The armor is further provided with means for taking up any slack which might occur in the link and which will also automatically operate to hold the links in proper position with relation to each other in the event that they expand or contract while in use.

In the accompanying drawings:—

Figure 1 is a fragmentary plan view of the armor.

Fig. 2 is a side elevation of the same.

Fig. 3 is a transverse sectional view of the same cut on the line 3—3 of Fig. 1.

Fig. 4 is an edge view of one of the links of the armor.

Fig. 5 is an under plan view of one plate used upon the armor.

Fig. 6 is a similar view of the other plate used upon the armor.

The major portion of the armor is composed of links 1 which are preferably formed from cast metal as for instance malleable iron. Each link includes an intermediate portion 2 which is provided in the vicinity of one end with an opening 3 and which is provided at one end of the said opening and on its opposite faces with grooves 4. The intermediate portion 2 is provided at its opposite end with a hook or knuckle 5. The knuckle 5 is similar in design to the knuckle usually employed upon the link of a sprocket chain and the said knuckle may be engaged in the opening 3 by passing the end portion thereof through the groove 4 and turning the knuckle whereby one link may be engaged with the adjacent link by having the end portion of the knuckle 5 passing through the opening 3 of the adjacent link.

Each link 1 is provided at the sides of its intermediate portion 2 with side portions 6. The portion 6 at one side of the intermediate portion 2 projects beyond one end of the said portion 2 while the portion 6 at the opposite side of the portion 2 projects beyond the opposite end of the said portion 2 as best shown in Fig. 1 of the drawing. Ribs 7 of any appropriate design may be provided upon the intermediate portion 2 and the inner parts of the portion 6 as shown in Fig. 1. When the armor is applied to a tire the said ribs 7 may travel on the surface of the roadway and serve as anti-skidding means for the structure. Inasmuch as the links 1 are pivotally connected with each other they will flex or bend with relation to each other and consequently the resiliency of the tire is not impaired and the portions of the links shield or cover the tire to such an extent as to effectually protect the same against wear or other usage which under ordinary circumstances serve to wear or impair the same.

In conjunction with each armor structure as hereinbefore described one or more tensioning devices may be employed for holding the links in proper position upon the tire and such a tensioning device is illustrated in Figs. 1, 2 and 3 of the drawing.

The tensioning device comprises a plate 8 which is pivotally connected with one of the links 1 and a plate 9 which is also pivotally connected with one of the links 1. The plate 9 is arranged to slip under the plate 8 and the said plates may have movement with relation to each other longitudinally of the tire. The said plates 8 and 9 are provided at their side edges with inwardly extending lugs 10 through which bolts 11 pass. Springs 12 are interposed between the heads of the bolts 11 and the adjacent lugs 10 and nuts 13 are screwthreaded upon the said bolts. Springs 12 are also interposed between the nuts and the adjacent lugs 10. The said springs 12 are under compression with a tendency to force the lugs 10 which are carried by the plates 8 and 9 toward each other and consequently should the links 1 expand while the armor is in use the said plates are moved with relation to each other whereby the links 1 are securely held in position upon the tire. The plate 8 may be provided with suitable ribs 14 which may serve as antiskidding devices. The edges of the plate 8 may extend slightly around the edges of the plate 9 as shown in Fig. 3 and thereby guide the same.

To assemble the armor upon a tire the links are connected together and before the tire is inflated the links are placed around the same and the plate 9 is entered under the plate 8. The bolts 11 are then passed through the lugs 10 and consequently the springs 12 and the nuts 13 are applied.

The tire is then inflated whereby its outer portion completely fills the inner surfaces of the links 1 and this adds tension to the said links whereby the plates 8 and 9 are moved slightly away from each other and consequently the compression of the springs 12 is increased. Hence the armor is securely held in position upon the tire and in the event that the links should expand the springs 12 will elongate and move the plate 9 under the plate 8 thus taking up any slack in the link and automatically maintaining them under tension upon the periphery of the tire. As shown in the drawings a pad 6' may be inserted between the armor and the tire, if desired.

From the foregoing description taken in conjunction with the accompanying drawing, it will be seen that a tire armor of simple and durable structure is provided, that the same may be easily and quickly applied to a tire and readily removed therefrom, and when in position thereon will effectually protect the tire against wear and puncture and also serve as means for preventing lateral skidding of the tire and the wheel which carries the same.

Having described the invention what is claimed is:—

1. In a tire armor a link having an intermediate portion provided with an opening and having grooves leading into the said opening, the said intermediate portion being further provided with a knuckle, the link having at the opposite sides of the said intermediate portion side portions, one of which projects beyond one end of the intermediate portion and the other of which projects beyond the opposite end of the said intermediate portion.

2. In a tire armor a link having an intermediate portion provided with an opening in the vicinity of one end and carrying a knuckle at its opposite end, ribs provided upon the intermediate portion, the link having side portions located at the opposite sides of the intermediate portion, the side portion at one side of the intermediate portion projecting beyond one end thereof and the side portion at the opposite side projecting beyond the opposite end thereof.

In testimony whereof I affix my signature.

WILLIAM J. ADAMS.

Copies of this patent may be obtained for five cents each, by addressing the "Commissioner of Patents Washington, D. C."